Figure 1:
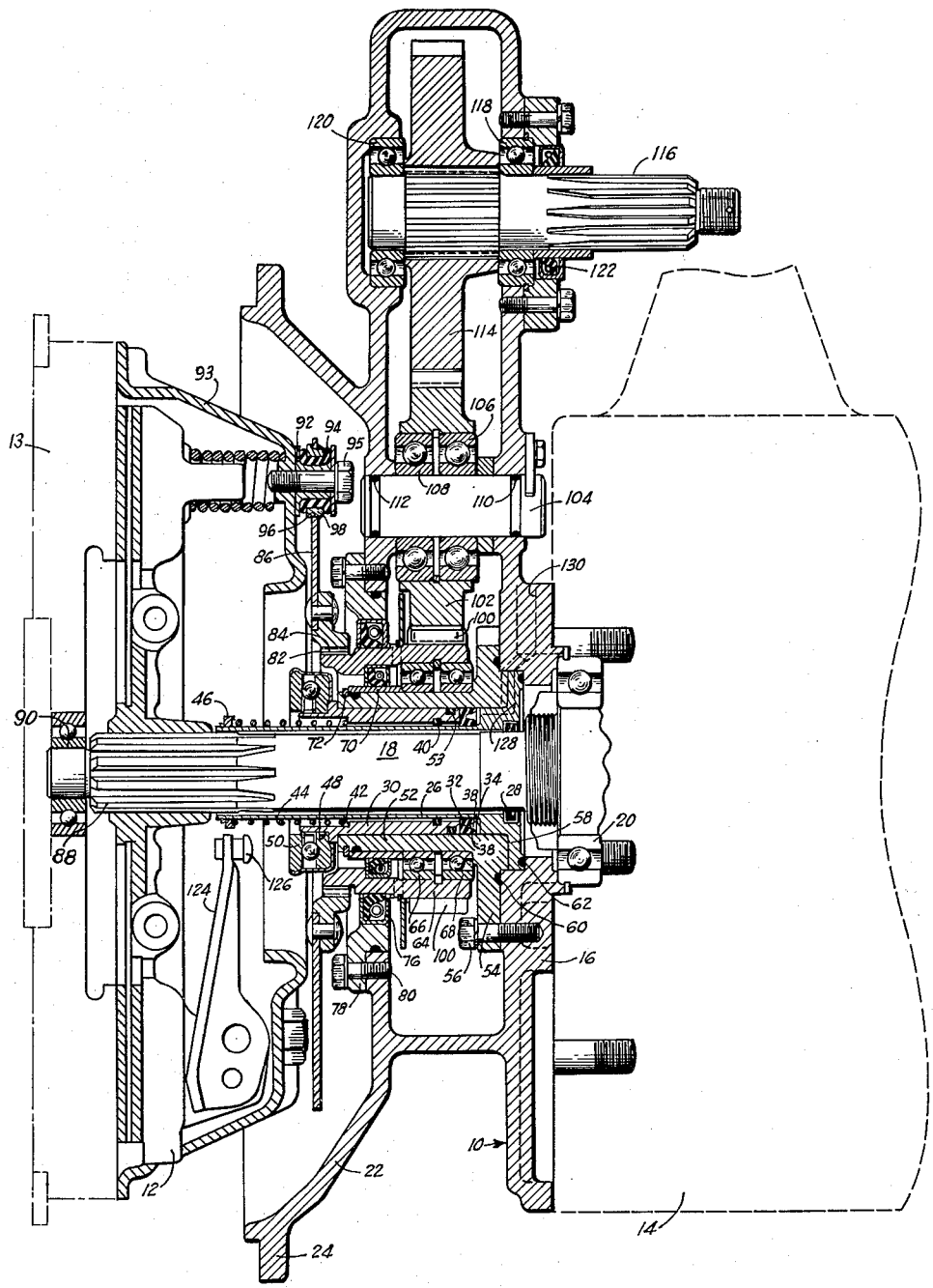

INVENTORS
Joseph C. Funk
BY Howard C. Funk
ATTORNEY

United States Patent Office 3,004,438
Patented Oct. 17, 1961

3,004,438
POWER TAKE-OFF ASSEMBLY
Joseph C. Funk and Howard C. Funk, Coffeyville, Kans., assignors to Funk Mfg. Company, Coffeyville, Kans., a corporation of Oklahoma
Filed Oct. 6, 1958, Ser. No. 765,359
4 Claims. (Cl. 74—15.63)

This invention relates to improvements in power take-off structures, and more particularly, but not by way of limitation, to a continuous running gear or chain power take-off assembly provided with complete independence from the truck clutch or truck transmission.

A truck or vehicle engine is frequently utilized for driving auxiliary equipment in addition to providing the power for the truck itself. For example, in the oil industry, hoists, winches and many other types of equipment are powered or driven by means of a truck engine in lieu of a separate engine therefor. Thus, many types of power take-off devices have been developed for actuation by the truck engine for transmitting power to the auxiliary equipment. The present day power take-off assemblies usually comprise an auxiliary or driven shaft member adapted for intermittent rotation by the gear train of the truck transmission. The operation of the power take-off assembly is directly dependent upon the truck transmission and truck clutch, thereby necessitating an engagement of the truck transmission at all times when it is desired to operate the auxiliary equipment through the power take-off.

The present invention contemplates a novel power take-off assembly particularly designed and constructed to provide a continuous running or operation thereof with complete independence from the truck clutch pedal or truck transmission. The novel power take-off structure is adapted to be interposed betwen the truck clutch and transmission, and is disposed in the space normally occupied by the flywheel housing. The power take-off shaft is driven from the outer body of the clutch, thus providing for the continuous running feature of the power take-off shaft since the clutch normally rotates continuously during the operation of the truck engine, regardless of whether or not the truck transmission is in a neutral or engaged position. It will be apparent that the power take-off may be utilized for driving the auxiliary equipment at all times when the truck engine is in operation with a complete independence from the truck transmission. Thus, wear on the truck transmission will be greatly reduced to provide for a more efficient and longer life therefor.

It is an important object of this invention to provide a novel power take-off assembly for transmitting power from a truck engine to auxiilary power equipment.

It is another object of this invention to provide a power take-off assembly for a truck engine which is completely independent in operation from the truck transmission and truck clutch actuation mechanism.

Another object of this invention is to provide a novel power take-off for truck engines which may be actuated continuously during the operation of the engine, regardless of whether or not the truck transmission is engaged.

Still another object of this invention is to provide a continuous running power take-off particularly designed and constructed to be interposed between the clutch and transmission of a truck engine and disposed in the space normally occupied by the flywheel housing in order to facilitate the installation of the power take-off assembly on a truck engine.

It is still another object of this invention to provide a power take-off assembly which is simple and efficient in operation and economical and durable in construction.

Other objects and advantages of the invention will be evident from the following detailed description, read in conjunction with the accompanying drawings, which illustrate our invention.

In the drawings:

FIGURE 1 is a sectional elevational view of a power take-off assembly embodying the invention, with portions shown in dotted lines for phantom depiction for better illustration.

Referring to the drawings in detail, reference character 10 refers in general to a power take-off assembly interposed between a conventional friction type clutch 12 and a conventional truck transmission 14, as will be hereinafter set forth. The power take-off assembly 10 is preferably encased within a suitable housing 16 adapted to be secured to the transmission 14 in any well known manner in lieu of the flywheel housing (not shown) normally secured thereto. The housing 16 is substantially cylindrical in configuration and is disposed around the normal drive shaft 18 usually provided with the transmission 14 and extending axially outward therefrom. Suitable bearing members 20 are provided between the housing 16 and the drive shaft 18 in order to provide for an independent rotation of the drive shaft 18 with respect to the housing 16. Thus, it will be apparent that the housing 16 remains stationary and is securely supported by the transmission 14. The housing 16 is provided with an outwardly extending and flared circumferential flange 22 of substantially the configuration of the profile of the clutch 12 and oppositely disposed from the transmission 14 to provide clearance for the clutch, as clearly shown in the drawings. An outwardly extending circumferential flange 24 is provided on the flange 22 for receiving the flywheel housing (not shown) thereon for a purpose as will be hereinafter set forth.

The power take-off assembly 10 comprises a tubular support mandrel 26 disposed around the drive shaft 18 and spaced therefrom by means of a suitable annular bushing member or bearing 28. In this manner, the mandrel 26 remains stationary and does not rotate with the drive shaft 18, and in no way interferes with the rotational movement thereof. A tubular piston 30 is slidably disposed around the outer periphery of the mandrel 26 and is provided with an annular piston head member 32 at one end thereof adjacent an outwardly extending shoulder 34 provided on the mandrel 26. The piston head 32 is preferably constructed from a suitable flexible material, such as rubber, or the like, but not limited thereto, in order to provide a sealing element for the piston 30. The piston head 32 is provided with an annular groove 36 thereby forming a chamber 38 between the piston head 32 and the shoulder 34 for a purpose as will be hereinafter set forth. An annular sealing ring member 40 is provided on the inner periphery of the piston 30 for additional sealing betwen the piston 30 and the mandrel 26.

The piston 30 is provided with an inwardly directed shoulder 42 spaced from the head member 32 for receiving one end of a spring 44 thereagainst. The spring 44 is disposed around the mandrel 26 and is anchored at its opposite end to an outwardly extending circumferential flange or ring member 46 provided on the outer periphery of the mandrel 26. The spring 44 constantly urges the piston 30 in a direction toward the shoulder 34 and away from the clutch member 12. The piston 30 is provided with a reduced portion 48 at the outer extremity thereof for receiving a suitable annular bearing member 50 thereon for a purpose as will be hereinafter set forth.

The piston 30 and inner mandrel 26 are retained in position around the drive shaft 18 by a tubular support mandrel 52 disposed around the piston 30. A suitable annular sealing ring 53 is provided on the outer periphery of the piston 30 for sealing between the piston and the support mandrel 52. The support mandrel 52 is provided with an outwardly extending circumferential flange 54 which may be secured to the housing 16 by means of suitable bolts 56 for rigidly securing the support mandrel 52 therein. The flange 54 cooperates with an outwardly extending circumferential flange 58 provided on the inner mandrel 26 for securely retaining the inner mandrel 26 within the housing 16. Suitable sealing rings 60 and 62 may be provided on the flanges 54 and 58, respectively, to provide for sealing between the housing 16 and the flanges.

A tubular gear 64 is journalled on the support mandrel 52 by a pair of suitable spaced roller bearing members 66 and 68. The bearing members 66 and 68 are retained in longitudinal position on the support mandrel 52 by a suitable sleeve member 70 and a cooperating locking ring 72, as is well known. A suitable annular sealing element 74 is disposed between the stationary sleeve 70 and the rotatable tubular gear 64 for sealing therebetween. A similar sealing element 76 is disposed around the outer periphery of the tubular gear 64 and adjacent a stationary annular ring member 78 which is rigidly secured to the housing 16 by suitable bolt members 80. The sealing element 76 provides a sealing between the rotatable tubular gear 64 and the stationary ring 78. It will be apparent that there will be an efficient seal between the relative rotatable members of the power take-off assembly to preclude leakage of lubricants or other fluids from the housing 16.

The tubular gear 64 is provided with gear teeth 82 adjacent the outer extremity thereof for meshing with mating gear teeth 84 of a floating drive plate 86. The floating drive plate 86 is disposed in the proximity of the clutch 12 as clearly shown in the drawings. The clutch 12 is preferably any suitable friction type clutch, but not limited thereto, and is usually keyed or suitably secured to the splines 88 of the drive shaft 18, as is well known. The outer extremity 90 of the drive shaft 18 is connected in any well known manner (not shown) to a flywheel (not shown) of an engine (not shown) and is rotated thereby through the clutch 12 when the engine is in operation, as is well known. In addition, the outer body 93 of the clutch 12 is connected directly to the flywheel in any suitable manner (not shown), and as is well known, and continues to rotate simultaneously therewith during the operation of the truck engine, regardless of whether the clutch 12 is engaged or disengaged. When the clutch 12 is engaged, as shown in the drawings, the entire clutch 12 rotates for transmitting rotation to the drive shaft 18. However, when the clutch 12 is disengaged, the driven disc portion 13 thereof, which is keyed to the shaft 18 as hereinbefore set forth, remains stationary and the drive shaft 18 will not be rotated, although the outer body 93 will continue to rotate with the flywheel, as is common with this type of clutch.

A plurality of spool members 92 are secured to the outer body 93 of the clutch 12 by means of suitable bolts 95. The spool members extend axially outward from the clutch body 93 and are circumferentially spaced thereon in the proximity of the outer periphery of the floating drive plate 86. Each spool is provided with a bushing 94 preferably constructed of a pliable material, such as rubber, but not limited thereto. Each of the bushings 94, only one of which is shown, extends through an aperture 96 adjacent the outer periphery of the floating drive plate 86 and is preferably secured therein by a suitable flanged sleeve member 98. It will be apparent that suitable cooperating spring members and dogs (not shown) may be utilized in lieu of the bushings 94 in order to provide a radially outward pressure from the spool member 92 to the aperture 96 for an engagement between the clutch body 93 and the floating drive plate 86. Thus, the floating plate 86 rotates continually with the clutch 12 during the normal operation thereof.

The rotation of the drive plate 86 is transmitted to the tubular gear 64 through the mating gear teeth 84 and 82. A second set of gear teeth 100 are provided on the tubular gear 64 and are longitudinally spaced from the first gear teeth 82. The teeth 100 mesh with a complementary gear 102 which is journalled on a suitable pivot shaft 104 by a pair of spaced roller bearings 106 and 108. The shaft 104 is suitably secured to the housing 16 and is preferably provided with suitable longitudinally spaced sealing ring members 110 and 112 for precluding leakage of fluid between the housing 16 and the shaft 104. The gear 102 in turn meshes with a complementary gear 114 which is suitably keyed or otherwise secured to a power take-off or driven shaft 116. The power take-off shaft 116 is journalled in the housing by means of a pair of spaced roller bearings 118 and 120, and rotates simultaneously with the gear 114. A suitable sealing element 122 may be provided around the power take-off shaft 116 to preclude leakage of fluid therearound. The power take-off shaft may be suitably secured to any desired auxiliary equipment (not shown) which is to be driven thereby.

The clutch 12, as hereinbefore set forth, is preferably of a dry friction type and is usually provided with a plurality of radially disposed clutch throw out arms 124, only one of which is shown. When the throw out arms 124 are in the position shown in the drawings, the clutch 12 is normally in an engaged position, and all portions thereof rotate simultaneously and constantly when the truck engine (not shown) is in operation. The throw out arm is usually provided with a contact head 126 at the innermost end thereof adapted to be moved in a left hand direction, as viewed in the drawings, when it is desired to disengage the clutch and stop the rotation of the driven disc portion 13 thereof. The contact head 126 is in substantial alignment with the bearing member 50 carried by the piston 30. It will be apparent that a left hand movement of the piston against the action of the spring 44 will move the bearing 50 into contact with the head 126, and a continued left hand movement thereof will cause a disengagement of the clutch 12 whereby the clutch body 93 will be released from the driven disc portion 13 to preclude rotative movement of the drive shaft 18. The piston 30 is moved longitudinally by means of hydraulic power or fluid (not shown) applied to the chamber 38 adjacent the piston head 32. A passageway 128 is provided in the inner mandrel 26 in communication with a second passageway 130 provided in the housing 116 for directing hydraulic fluid into the chamber 38. It will be apparent that application of hydraulic pressure to the chamber 38 in excess of the pressure of the spring 44 will cause the piston 30 to move in a left hand direction for disengaging the clutch body 93. Similarly, a release of the hydraulic pressure in the chamber 38 will permit the action of the spring 44 to return the piston 30 to the normal position therefor and engage the clutch body 93 for rotation of the entire clutch 12.

*Operation*

When the truck engine (not shown) is in operation, the power take-off shaft 116 normally is rotated through the gear train of the power take-off assembly 10. The engaged clutch 12 constantly rotates during the operation of the engine, as is well known, and the rotation of the clutch 12, including the clutch body 93, is transmitted to the floating drive plate 86 through the circumferentially spaced bushing members 94 and sleeves 98. The rotation of the floating drive plate 86 is transmitted to the gear 102 through the tubular gear 64, and thence the rotation is transmitted to the gear 114. The gear 114 is rigidly connected to the power take-off shaft 116, and thus, the power take-off shaft 116 rotates simultaneously therewith. Thus, the power take-off shaft will rotate continuously during the operation of the engine, regardless of whether or not the transmission 14 is engaged.

When it is desired to stop the rotation of the drive shaft 18 for any reason, hydraulic fluid may be directed into the chamber 38 in any well known manner (not shown) through the complementary passageways 128 and 130 in order to overcome the pressure of the spring 44. The fluid pressure will move the piston 30 in a left hand direction, as viewed in the drawings, whereby the bearing member 50 will contact the head 126 of the throw out arms 124. A continued left hand movement of the piston 30 will move the head 126 in a left hand direction to disengage the clutch body 93 from the driven disc portion 13 of the clutch 12, as is well known in this type of clutch mechanism. The floating drive plate 86 will continue to be rotated since the clutch body 93 will be rotated by the flywheel continuously during the operation of the engine. The gear train will, therefore, be continuously operated, and the power take-off shaft 116 will be rotated continuously, regardless of whether the truck transmission 14 is in a driving position or a neutral position.

When it is desired to start the rotation of the shaft 18, it is merely necessary to relieve the fluid pressure from the chamber 38 through the passageways 128 and 130, whereby the spring 44 will function to move the piston 30 in a right hand direction and move the bearing 50 out of contact with the head 126. Thus, the clutch 12 will be in an engaged position for rotating the driven disc 13 with the clutch body 93, and transmitting rotation through the clutch to the drive shaft 18.

From the foregoing, it will be apparent that the present invention provides a novel power take-off assembly wherein the power take-off shaft may be driven completely independently from the truck transmission or truck clutch actuation mechanism. The novel power take-off assembly is adapted to be mounted on the truck engine between the normal truck transmission and truck clutch in the space usually occupied by the flywheel housing. Thus, the novel power take-off assembly may be readily installed on a presently available truck engine with a minimum of modification thereto. The novel power take-off assembly is simple and efficient in operation, and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

We claim:

1. In combination with a transmission drive shaft and a clutch driven by a prime mover, a power take-off assembly comprising a housing secured between the transmission and the clutch, an inner mandrel disposed within the housing and around the drive shaft, said inner mandrel stationary with respect to the drive shaft, a hydraulic piston movably disposed around the inner mandrel, bearing means carried by the piston for intermittent disengagement of the clutch without interruption of operation of the power take-off assembly, a support mandrel disposed around the piston, a gear train carried by the support mandrel and the housing, means provided on the outer body of the clutch for continuous actuation of the gear train when the clutch is either engaged, or disengaged, and a power take-off shaft driven by the gear train.

2. In combination with a transmission drive shaft and a clutch driven by a prime mover, a power take-off assembly interposed between the clutch and transmission and comprising a stationary inner mandrel disposed around the drive shaft, a hydraulically actuated piston slidably disposed on the inner mandrel, bearing means carried by the piston for intermittent disengagement of the clutch without interruption of the operation of the power take-off assembly, a stationary outer support mandrel disposed around the piston, a gear train carried by the outer support mandrel and the housing, means provided on the outer body of the clutch for actuation of the gear train in an engaged or disengaged position of the clutch independently from the transmission, passageway means for supplying hydraulic fluid to the piston for actuation thereof, and a power take-off shaft driven by the gear train in engaged and disengaged positions of the clutch.

3. In combination with a clutch driven by a prime mover and a transmission drive shaft, a power take-off assembly interposed between the transmission and clutch and comprising a support mandrel disposed around the drive shaft, a gear train carried by the support mandrel and the housing, means provided on the clutch for actuation of the gear train independently of the transmission, a power take-off shaft actuated by the gear train, hydraulic piston means interposed between the support mandrel and the drive shaft, passageway means in communication with the piston to direct hydraulic fluid thereagainst for actuation thereof into contact with the clutch, said clutch disengaged upon contact of the piston thereagainst whereby actuation of the drive shaft is interrupted to provide intermittent actuation of the transmission without interruption of the rotation of the power take-off shaft, and spring means provided around the drive shaft for returning the piston to a position out of contact with the clutch upon relieving of the hydraulic fluid whereby the clutch will rotate the drive shaft for actuation of the transmission.

4. In combination with a clutch driven by a prime mover and a transmission drive shaft, a power take-off assembly as described in claim 3, wherein the means provided on the clutch for actuation of the gear train independently of the transmission comprises a floating drive plate which is carried by the portion of the gear train carried by the support mandrel and that is driven by a plurality of resilient bushing members secured to a continuously rotating outer clutch body.

References Cited in the file of this patent

UNITED STATES PATENTS

| | | |
|---|---|---|
| 2,422,155 | Wemp | June 10, 1945 |
| 2,468,008 | Yocum | Apr. 19, 1949 |
| 2,593,192 | Rockwell | Apr. 15, 1952 |
| 2,654,255 | Ferguson et al. | Oct. 6, 1953 |
| 2,674,892 | Keese et al. | Apr. 13, 1954 |
| 2,680,377 | Gerst | June 8, 1954 |
| 2,717,680 | Smith | Sept. 13, 1955 |
| 2,757,769 | Roise | Aug. 7, 1956 |
| 2,864,480 | Sink | Dec. 16, 1958 |
| 2,932,202 | Rinkema | Apr. 12, 1960 |